United States Patent
Draper et al.

(10) Patent No.: US 7,321,996 B1
(45) Date of Patent: Jan. 22, 2008

(54) DIGITAL DATA ERROR INSERTION METHODS AND APPARATUS

(75) Inventors: Andrew Draper, Chesham (GB); Kulwinder Dhanoa, Southhall (GB)

(73) Assignee: Altera Corporation, San Jose, CA (US)

( * ) Notice: Subject to any disclaimer, the term of this patent is extended or adjusted under 35 U.S.C. 154(b) by 453 days.

(21) Appl. No.: 10/939,064

(22) Filed: Sep. 9, 2004

(51) Int. Cl.
*G06F 11/00* (2006.01)

(52) U.S. Cl. .................................................. 714/703
(58) Field of Classification Search ................. 714/703
See application file for complete search history.

(56) References Cited

U.S. PATENT DOCUMENTS 6,751,756 B1 *  6/2004  Hartnett et al. ................. 714/54
7,149,945 B2 * 12/2006  Brueggen ...................... 714/758

\* cited by examiner

*Primary Examiner*—Shelly Chase
(74) *Attorney, Agent, or Firm*—Ropes & Gray LLP; Robert R. Jackson; Chia-Hao La

(57) ABSTRACT

Methods and apparatus are provided to insert errors into digital data. The errors can be inserted into the data itself, or into the corresponding error correcting code bits. The invention comprises a register, whose contents are combined with data using exclusive-OR circuitry. By varying the contents of that register, an error can be inserted into a specific bit in a particular data word, or into multiple bits in the same word.

19 Claims, 2 Drawing Sheets

DIGITAL DATA ERROR INSERTION METHODS AND APPARATUS

BACKGROUND OF THE INVENTION

Ensuring the integrity of digital data is a key concern in system development. As such, various error detection and error correction mechanisms have been developed. For instance, a simple error detection technique involves the use of checksums. A checksum includes one or more bits added to a data word, whose value is the modular sum of all the bits in that word. When the word is read from memory, error detection circuitry can verify that the data value is consistent with the checksum, and if an error is detected, can take appropriate action. For example, the system can stop using the corrupted memory word, stop using the entire memory page, record the error in a log file, or reset all or part of the system.

More advanced techniques permit not only detection, but also correction, of data errors. For instance, multiple checksums can be applied to overlapping regions of the data word. With this technique, a single bit data error will tend to result in two incorrect checksums, allowing identification of the corrupted bit. Moreover, one incorrect checksum can be interpreted as an error in the checksum itself, and not in any of the memory data bits.

Another common error correction technique involves the use of a Hamming code. This technique relies upon encoding data words in such a way that consecutive values will differ from each other by more than one bit. Thus, if one bit is corrupted, it can be identified by finding the closest valid data word encoding. This approach, like the multiple checksum technique, can detect multiple bit errors, but often cannot correct them. For instance, Hamming codes are typically configured to correct single bit errors and detect double bit errors.

As such error detecting and error correcting circuitry is incorporated into memory controllers and similar devices, it is often desirable to test their operation. In order to reliably test error detection or correction circuitry, at least one data word must be intentionally corrupted while the system is running. Therefore, a simple and systematic way to insert errors into digital data would allow easy triggering of the error detection or correction circuitry.

In view of the foregoing, it would be desirable to develop circuitry and methods to precisely insert errors into digital data. Furthermore, it would be desirable to make such circuitry easy to incorporate into existing systems.

SUMMARY OF THE INVENTION

In accordance with this invention, circuitry and methods are provided to insert errors into data words. An error can be targeted to a specific bit in a particular word, and can be introduced in either the data bits or the error detection/correction bits. Although the following description focuses on error correcting code ("ECC") circuitry, the invention can be applied to any error detection or error correction techniques. Similarly, although the following description focuses on use of the invention in memory circuitry, it will be understood that the invention is equally applicable elsewhere in a wide range of systems.

The invention introduces a multi-bit register into a system, e.g., in a memory controller. During normal operation, the register will contain all 0's. Each time the memory controller writes a word into an associated memory, the value of the data is combined with the value stored in the register using exclusive-OR ("XOR") circuitry. This combination is typically performed after a checksum is generated by ECC circuitry. If the register contains a value of 0, the data written to memory will be unchanged. However, if one or more of the register bits is set to 1, each of the corresponding bits in the memory word will be flipped (in accordance with the nature of the XOR gate) before being written. When the corrupted word is subsequently read from memory, the error will be detected, and the appropriate ECC circuitry will take effect.

The invention also includes the option of using a second register to introduce errors into the ECC bits, as opposed to the data bits. If this option is used, then each time a word is written to memory its ECC bits will be XOR'ed with the contents of the second register. Thus, if one or more of the second register's bits is set to 1, each of the corresponding ECC bits in the memory word will be flipped.

Because the invention only requires the use of, at minimum, one register and a group of XOR gates, the invention is easy to incorporate into existing systems. The invention therefore advantageously allows the systematic introduction of an error into digital data. This error will trigger an appropriate response from the ECC circuitry, allowing engineers to verify its operation and correctness.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
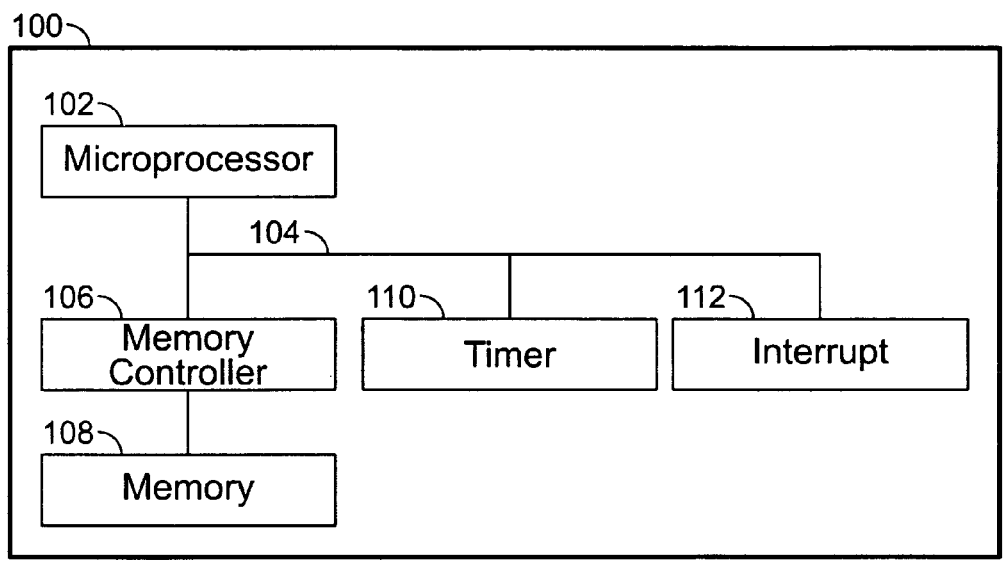
FIG. 1 is a block diagram of an illustrative system incorporating a memory controller and a memory.

FIG. 1 shows an integrated circuit ("IC") 100, which can be an application-specific integrated circuit ("ASIC"), a programmable logic device ("PLD"), or a hybrid of the two. IC 100 includes microprocessor 102, which communicates with memory controller 106, timer circuitry 110, and interrupt circuitry 112. IC 100 can also include other circuitry, such as Direct Memory Access ("DMA") circuitry, Universal Serial Bus ("USB") circuitry, and the like. Memory controller 106 is connected to memory circuitry 108, and supports interaction with that memory.

For instance, if memory 108 comprises synchronous dynamic random access memory ("SDRAM"), memory controller 106 might refresh the SDRAM contents at a certain frequency, read memory words, write memory words, and provide ECC functionality. Read and write operations can be applied to one memory word at a time, or can handle multiple memory words in the same operation. For example, a set of sequential words might be read to provide caching.

Figure 2:
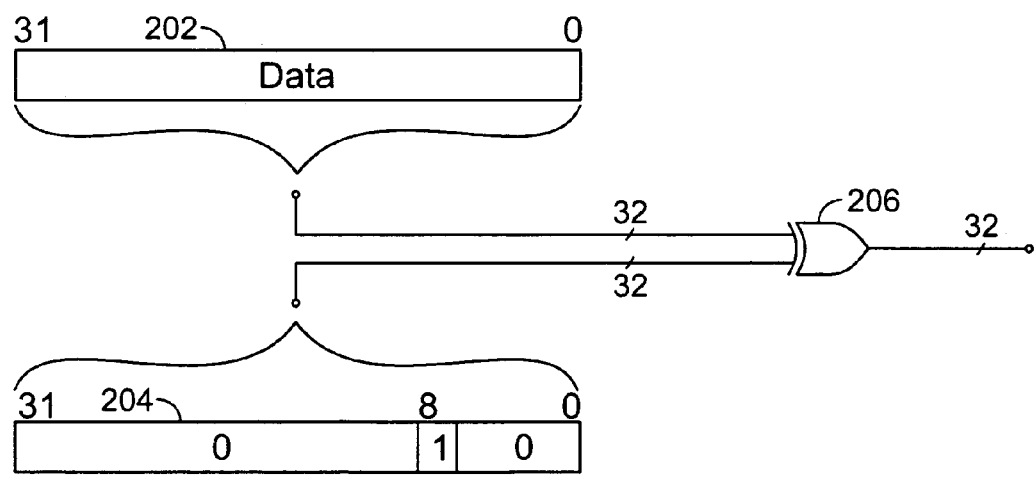
FIG. 2 is a diagram of illustrative error insertion in the data bits of a memory word in accordance with the invention.

FIG. 2 shows an illustrative embodiment of the invention, implemented on a memory controller such as controller 108.

Register 202 contains a 32-bit data word to be written into memory. Register 204 contains a 32-bit value that will be combined with the contents of register 202 using XOR circuitry 206. The embodiment shown in FIG. 2 combines the data in a parallel fashion, with XOR circuitry 206 comprising 32 2-input XOR gates, each XOR gate operating on the bits from a respective one of the 32 bit positions of registers 202 and 204. It is also possible to combine the data in a serial fashion using only a single XOR gate. In either case, the output of XOR circuitry 206 will be the final value of the data to be written.

Under normal operating conditions, register 204 will contain all 0's. In this case, the output of XOR circuitry 206 will be identical to the contents of data register 202, and the data to be written will match the contents of register 202. Thus, under most circumstances, the invention does not alter the perceived behavior of the memory controller in any way.

Now, suppose it is desirable to insert a single-bit error into the data to be written. This can be achieved by changing one of the bits of register 204 from 0 to 1. The example illustrated in FIG. 2 shows bit 8 of register 204 with a value of 1, and all other bits with a value of 0. Under these circumstances, combining the two registers with XOR circuitry 206 will cause bit 8 of the data word to be flipped. That is, the output of XOR circuitry 206 will be identical to the data word in register 202 except for bit 8, which will be reversed. Note that error insertion should normally occur after a checksum has been generated by ECC circuitry.

After the output of XOR circuitry 206 is written to memory, it will reside there until that data word is read. Upon being read, the ECC circuitry of the memory controller will detect the single bit error and take the appropriate actions. Preferably, these actions will include correcting the single-bit error and writing the corrected data value back into memory.

If it is desired to introduce a multiple-bit error into a data word, then more than one bit of register 204 can be set to 1. In this case, depending on the particular ECC technique being used and how many bits are corrupted, the ECC circuitry may or may not be able to detect the errors. If the errors are detected, the ECC circuitry may or may not be able to correct them.

Figure 3:
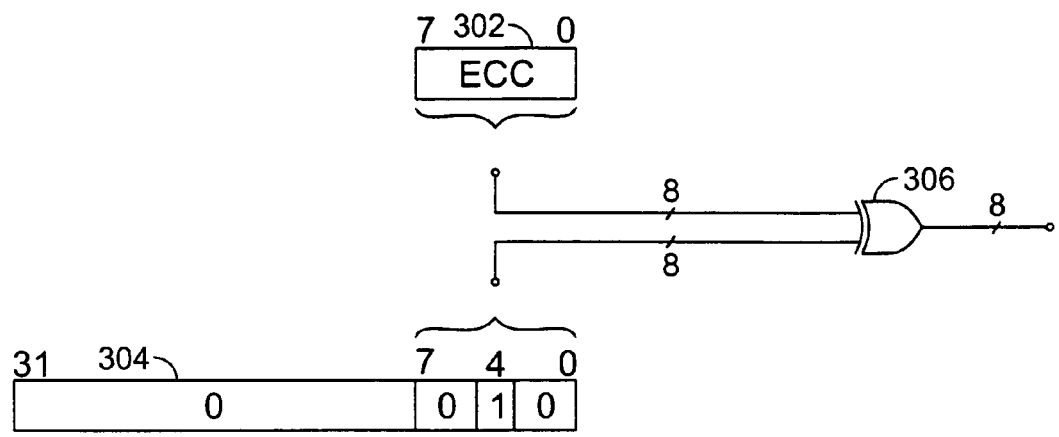
FIG. 3 is a diagram of illustrative error insertion in the ECC bits of a memory word in accordance with the invention.

FIG. 3 shows an additional aspect of the invention, which may be incorporated if desired. Register 302 contains the 8 ECC bits of a data word to be written to memory. Register 304 contains an 8-bit value to be combined with the contents of register 302 using XOR circuitry 306. The embodiment shown in FIG. 3 combines the data in a parallel fashion, with XOR circuitry 306 comprising 8 2-input XOR gates, each XOR gate operating on the bits from a respective one of the 8 relevant bit positions of registers 302 and 304. It is also possible to combine the data in a serial fashion using only a single XOR gate. In either case, the output of XOR circuitry 306 will be the final value of the data to be written.

Although register 304 is shown with 32 bits, only 8 of those bits are used (as shown in FIG. 3, those 8 bits are the register's least significant bits). Alternatively, if an 8-bit register is available, it may be used in place of the 32-bit register 304. Another possibility is the use of a 40-bit register to contain both the contents of register 204 and the 8 relevant bits of register 304.

The circuitry shown in FIG. 3 operates in much the same way as the circuitry in FIG. 2. Under normal operating conditions, the 8 relevant bits of register 304 are set to 0. Thus, the output of XOR circuitry 306 would be identical to the contents of register 302, and the ECC bits in question would be unaltered.

If it is desired to introduce a single-bit error into the ECC bits, one of the bits of register 304 can be changed from 0 to 1. The example illustrated in FIG. 3 shows bit 4 of register 304 with a value of 1, and all other bits with a value of 0. Under these circumstances, combining the two registers with XOR circuitry 306 will result in bit 4 of the data word being flipped. That is, the output of XOR circuitry 306 will be identical to the ECC bits in register 302 except for bit 4, which will be reversed.

After the output of XOR circuitry 306 is written to memory, it will reside there until that data word is read. Upon being read, the ECC circuitry of the memory controller will detect the single bit error and take the appropriate actions. Preferably, these actions will include correcting the single-bit error and writing the corrected ECC bits back into memory.

If it is desired to introduce a multiple-bit error into a data word, then more than one bit of register 304 can be set to 1. In this case, depending on the particular ECC technique being used and how many bits are corrupted, the ECC circuitry may or may not be able to detect the errors. If the errors are detected, the ECC circuitry may or may not be able to correct them.

As shown, the invention is easy to add to existing memory controllers. At minimum, it only requires one register and one or more XOR gates. Different aspects of the invention, such as a separate register for introducing errors into the ECC bits, can be incorporated as appropriate.

It should be noted that the embodiments of the invention shown in FIGS. 2 and 3 are merely illustrative. Other variations could be used. For example, the data to be written and its ECC bits need not be contained in one or two registers. They can be the output of asynchronous circuitry, or be stored in another type of memory element. Similarly, the contents of registers 204 and 304 could be stored in any type of memory element. Although the invention is shown above as operating on 32-bit data with 8 corresponding ECC bits, different word sizes could be used. For example, a 64-bit data word might utilize 9 ECC bits. Also, XNOR circuitry could be used in place of XOR circuitry 206 or 306 if the contents of register 204 or 304 are reversed appropriately.

The invention could also be applied during read operations instead of during write operations, unless the particular technology being used made that undesirable. For example, if read operations could only handle blocks of multiple words at once, it might be impossible to introduce an error into only one of those words without affecting the others. In addition, since the ECC circuitry is usually contained in the read path, it may be undesirable to modify the path to be tested.

Finally, although the invention is presented above in the context of inserting errors into memory words, it can be used to insert errors into any type of digital data. For instance, suppose there was a transmission link with ECC circuitry on the receiving end. A register and XOR circuitry could be added to the transmission circuitry, in order to insert single-bit errors into the data and trigger the receiver's ECC circuitry. The transmission data could be in the form of memory words, control signals, network packets, or the like.

Figure 4:
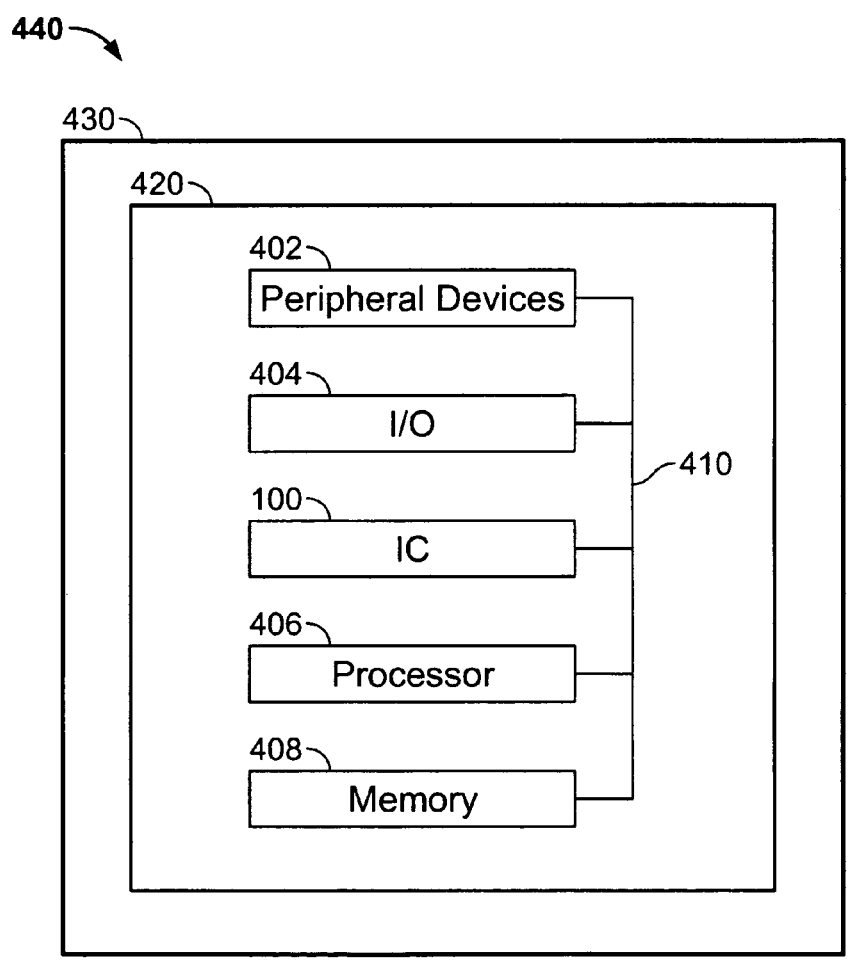
FIG. 4 is a block diagram of an illustrative end-user system incorporating the invention.

FIG. 4 illustrates an IC 100 of this invention in a data processing system 440. Data processing system 440 may include one or more of the following components: peripheral devices 402; I/O circuitry 404; processor 406; and memory 408. These components are coupled together by a system bus 410 and are populated on a circuit board 420 which is contained in an end-user system 430.

System 440 can be used in a wide variety of applications, such as computer networking, data networking, instrumentation, video processing, digital signal processing, or any other application where the advantage of using programmable or reprogrammable logic is desirable. IC 100 can be used to perform a variety of different logic functions. For example, IC 100 can be configured as a processor or controller that works in cooperation with processor 406. IC 100 may also be used as an arbiter for arbitrating access to a shared resource in system 440. In yet another example, IC 100 can be configured as an interface between processor 406 and one of the other components in system 440. It should be noted that system 440 is only exemplary, and that the true scope and spirit of the invention should be indicated by the following claims.

Thus it is seen that circuits and methods are provided for inserting errors into data for the testing of ECC circuitry. One skilled in the art will appreciate that the invention can be practiced by other than the described embodiments, which are presented for purposes of illustration and not of limitation, and the present invention is limited only by the claims which follow.

We claim:

1. Circuitry for inserting an error into a data word, comprising:
   a register containing a plurality of bits; and
   logic circuitry for combining the plurality of bits of the register with the data word, wherein:
   the register contains a same number of bits as the data word;
   the data word is unaltered when each bit of the register contains a value of zero; and
   the data word is altered when at least one bit of the register contains a value of one.

2. The circuitry of claim 1, wherein:
   the logic circuitry comprises an exclusive-OR gate.

3. The circuitry of claim 1, wherein:
   the data word is altered in at least one bit when at least one bit of the register contains a value of one; and
   the at least one bit of the data word corresponds to the at least one bit of the register that contains a value of one.

4. The circuitry of claim 3, wherein:
   the data word comprises error correcting code bits.

5. A memory controller comprising:
   error correcting code circuitry; and
   circuitry for inserting an error into a data word as defined in claim 1.

6. A printed circuit board, on which is mounted:
   a memory controller as defined in claim 5; and
   memory circuitry attached to the memory controller.

7. A data processing system comprising:
   a memory controller as defined in claim 5; and
   memory circuitry attached to the memory controller.

8. A method for testing error correcting code circuitry, comprising:
   receiving a data word to transmit to a destination;
   combining the data word with another word using a logic gate, wherein the other word contains a same number of bits as the data word and the combining comprises:
   leaving the data word unaltered when each bit of the other word contains a value of zero; and
   altering the data word when at least one bit of the other word contains a value of one; and
   transmitting a result of the combining to the destination.

9. The method of claim 8, wherein:
   the result differs from the data word by at least one bit.

10. The method of claim 8, wherein:
    the destination comprises a memory; and
    the transmitting comprises writing to the memory.

11. The method of claim 10, further comprising:
    reading the result from the memory; and
    detecting at least one error in the result, wherein an error is a bit that differs between the result and the data word.

12. The method of claim 11, further comprising:
    performing at least one action responsive to the at least one detected error.

13. The method of claim 12, wherein the performing comprises:
    identifying at least one bit where the at least one error occurs;
    reversing the value of the at least one bit to form a corrected word; and
    writing the corrected word back into the memory.

14. The method of claim 12, wherein the performing comprises:
    recording a memory address corresponding to the result in which at least one error was detected.

15. The method of claim 12, wherein the performing comprises:
    resetting the memory.

16. A method of inserting an error into memory, comprising:
    combining a memory word with another word using exclusive-OR circuitry, wherein the other word contains a same number of bits as the data word and the combining comprises:
    leaving the data word unaltered when each bit of the other word contains a value of zero; and
    altering the data word when at least one bit of the other word contains a value of one;
    writing the result of the combination into memory;
    reading back a plurality of memory words, including the result; and
    discovering an error in one of the plurality of memory words.

17. The method of claim 16, wherein:
    the memory word comprises data bits.

18. The method of claim 17, wherein:
    the memory word further comprises error correcting code bits.

19. The memory of claim 16, wherein:
    the plurality of memory words is stored in a cache.

* * * * *